(12) United States Patent
Mantes et al.

(10) Patent No.: US 12,357,136 B2
(45) Date of Patent: Jul. 15, 2025

(54) PORTABLE DUST EXTRACTOR

(71) Applicant: MILWAUKEE ELECTRIC TOOL CORPORATION, Brookfield, WI (US)

(72) Inventors: Jonathan M. Mantes, Franklin, WI (US); Fraizier Reiland, Myrtle Beach, SC (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

(21) Appl. No.: 17/529,564

(22) Filed: Nov. 18, 2021

(65) Prior Publication Data
US 2022/0151447 A1    May 19, 2022

Related U.S. Application Data

(60) Provisional application No. 63/115,884, filed on Nov. 19, 2020.

(51) Int. Cl.
*A47L 9/04* (2006.01)
*A47L 5/36* (2006.01)
(Continued)

(52) U.S. Cl.
CPC ............. *A47L 5/365* (2013.01); *A47L 9/2884* (2013.01); *B01D 46/009* (2013.01); *B01D 46/10* (2013.01);
(Continued)

(58) Field of Classification Search
CPC ...... A47L 9/10–127; A47L 5/365; A47L 9/04; B01D 46/009; B01D 46/10; B01D 46/521; B01D 46/4272
(Continued)

(56) References Cited

U.S. PATENT DOCUMENTS 3,541,764 A    11/1970 Astrom
4,944,065 A    7/1990 Svanberg et al.
(Continued)

FOREIGN PATENT DOCUMENTS

CN    201996403 U    10/2011
CN    103239189 A    8/2013
(Continued)

OTHER PUBLICATIONS

International Search Report and Written Opinion for Application No. PCT/US2021/059848 dated Mar. 4, 2022 (11 pages).

*Primary Examiner* — Michael D Jennings
(74) *Attorney, Agent, or Firm* — Michael Best & Friedrich LLP (57) ABSTRACT

A portable dust extractor is disclosed and includes a housing, a collection chamber in the housing, a first filter chamber in the housing and in fluid communication with the collection chamber, wherein a first filter is disposed within the first filter chamber, a second filter chamber in the housing and in fluid communication with the collection chamber, wherein a second filter is disposed within the second filter chamber, and a manifold system adjacent to the first filter chamber and the second filter chamber, wherein the manifold system is operable to permit air flow through the first filter and the second filter in a filter direction and operable to permit air flow through the one of the first filter and the second filter in a filter direction while permitting air flow through the other of the first filter and the second filter in a debris removal direction.

20 Claims, 6 Drawing Sheets

(51) Int. Cl.
*A47L 9/28* (2006.01)
*B01D 46/00* (2022.01)
*B01D 46/10* (2006.01)
*A47L 5/24* (2006.01)
*B01D 46/52* (2006.01)

(52) U.S. Cl.
CPC . *A47L 5/24* (2013.01); *A47L 9/04* (2013.01); *B01D 46/521* (2013.01)

(58) Field of Classification Search
USPC .................................................. 15/352, 347
See application file for complete search history.

(56) References Cited

U.S. PATENT DOCUMENTS

| | | |
|---|---|---|
| 5,013,333 A | 5/1991 | Beaufoy et al. |
| 5,032,155 A | 7/1991 | Wiese et al. |
| 5,194,077 A | 3/1993 | Bargiel et al. |
| 5,331,713 A | 7/1994 | Tipton |
| 5,500,976 A | 3/1996 | Rohrbacher et al. |
| 5,588,179 A | 12/1996 | Bargiel et al. |
| 5,601,659 A | 2/1997 | Rohrbacher |
| 5,718,015 A | 2/1998 | Rohrbacher |
| 5,826,298 A | 10/1998 | Rohrbacher et al. |
| 5,974,626 A | 11/1999 | Wood et al. |
| 6,094,774 A | 8/2000 | Larsen et al. |
| 6,260,235 B1 * | 7/2001 | Leung ...................... A47L 5/28 15/422.2 |
| 6,302,967 B1 | 10/2001 | Rohrbacher et al. |
| 6,315,647 B1 | 11/2001 | Ghilardi |
| 6,391,073 B1 | 5/2002 | Koga |
| 6,514,354 B2 | 2/2003 | Rohrbacher et al. |
| 6,578,714 B2 | 6/2003 | Rohrbacher et al. |
| 6,857,162 B1 | 2/2005 | Rasmussen |
| 7,082,640 B2 | 8/2006 | McCutchen |
| 7,118,609 B2 | 10/2006 | Valentini |
| 7,162,771 B2 | 1/2007 | Grosze et al. |
| 7,186,281 B2 | 3/2007 | Cheng |
| 7,282,074 B1 | 10/2007 | Witter |
| 7,363,680 B2 | 4/2008 | Legatt |
| 7,644,469 B2 | 1/2010 | Beers et al. |
| 7,837,304 B2 | 11/2010 | Eguchi et al. |
| 7,861,367 B2 | 1/2011 | Eckstein et al. |
| 7,867,304 B2 | 1/2011 | Stewen et al. |
| 7,871,463 B2 | 1/2011 | Hayama et al. |
| 7,947,099 B2 | 5/2011 | Valentini |
| 7,950,103 B2 | 5/2011 | Williamson et al. |
| 7,951,214 B2 | 5/2011 | Menrik et al. |
| 7,962,994 B2 | 6/2011 | Beers |
| 7,966,691 B2 | 6/2011 | Takahashi et al. |
| 7,976,614 B2 | 7/2011 | Ekstein et al. |
| 8,015,660 B2 | 9/2011 | Bruntner |
| 8,029,584 B2 | 10/2011 | Castronovo |
| 8,074,671 B2 | 12/2011 | Castronovo et al. |
| 8,142,554 B2 | 3/2012 | Eckstein et al. |
| 8,161,598 B2 | 4/2012 | Black et al. |
| 8,186,005 B2 | 5/2012 | Stewen et al. |
| 8,211,216 B2 | 7/2012 | Castronovo |
| 8,266,761 B2 | 9/2012 | Beers |
| 8,272,134 B2 | 9/2012 | Soika et al. |
| 8,388,415 B2 | 3/2013 | Soika et al. |
| 8,393,048 B2 | 3/2013 | Rentschler et al. |
| 8,443,485 B2 | 5/2013 | Kunz et al. |
| 8,505,161 B2 | 8/2013 | Schick et al. |
| 8,516,654 B1 | 8/2013 | McCutchen et al. |
| 8,561,512 B2 | 10/2013 | Lovelass et al. |
| 8,584,308 B2 | 11/2013 | Williamson et al. |
| 8,677,557 B2 | 3/2014 | McCutchen |
| 8,695,154 B2 | 4/2014 | Sever et al. |
| 8,940,064 B2 | 1/2015 | Hara et al. |
| 8,961,633 B2 | 2/2015 | Kienzle et al. |
| 8,997,311 B2 | 4/2015 | Huber et al. |
| 9,017,441 B1 | 4/2015 | Vemuri |
| 9,220,387 B2 | 12/2015 | Nonnenmann et al. |
| 9,221,110 B2 | 12/2015 | Guth |
| 9,271,620 B2 | 3/2016 | Meredith et al. |
| 9,351,620 B2 | 5/2016 | Frank et al. |
| 9,380,919 B2 | 7/2016 | Hensel et al. |
| 9,408,509 B2 | 8/2016 | Plato et al. |
| 9,585,533 B2 | 3/2017 | Hensel et al. |
| 9,700,824 B2 | 7/2017 | Vetse |
| 9,844,309 B2 | 12/2017 | Plato et al. |
| 9,981,214 B2 | 5/2018 | King, Jr. |
| 10,045,673 B2 | 8/2018 | Foenss |
| 10,470,632 B2 | 11/2019 | Foenss |
| 10,507,415 B2 | 12/2019 | Montalti et al. |
| 2001/0042558 A1 | 11/2001 | Rohrbacher et al. |
| 2002/0088746 A1 | 7/2002 | Rohrbacher et al. |
| 2004/0221417 A1 | 11/2004 | Grosze et al. |
| 2005/0011036 A1 * | 1/2005 | McCutchen ............... A47L 9/12 15/319 |
| 2005/0055795 A1 * | 3/2005 | Zeiler ................... A47L 9/2884 15/353 |
| 2005/0081319 A1 | 4/2005 | Legatt |
| 2006/0260281 A1 | 11/2006 | Peng |
| 2007/0119131 A1 | 5/2007 | Nakano et al. |
| 2009/0000485 A1 * | 1/2009 | Valentini .................. A47L 9/20 55/284 |
| 2009/0019710 A1 | 1/2009 | Grossman et al. |
| 2009/0282641 A1 | 11/2009 | Black et al. |
| 2009/0307865 A1 | 12/2009 | Williamson et al. |
| 2011/0016655 A1 | 1/2011 | Beers |
| 2011/0226130 A1 | 9/2011 | Kienzle et al. |
| 2011/0289716 A1 | 12/2011 | Williamson et al. |
| 2013/0263406 A1 | 10/2013 | Amisani et al. |
| 2014/0102053 A1 | 4/2014 | Vetse |
| 2014/0237763 A1 * | 8/2014 | Holsten .................... A47L 9/20 96/417 |
| 2015/0135475 A1 | 5/2015 | Foenss |
| 2016/0016270 A1 | 1/2016 | Batres et al. |
| 2016/0100724 A1 | 4/2016 | Valentini |
| 2016/0150932 A1 | 6/2016 | Foenss |
| 2016/0227974 A1 | 8/2016 | Meredith et al. |
| 2017/0001136 A1 | 1/2017 | Hensel et al. |
| 2017/0020352 A1 | 1/2017 | Amisani et al. |
| 2017/0056988 A1 | 3/2017 | Guth |
| 2017/0079492 A1 | 3/2017 | Kjaergaard |
| 2017/0106321 A1 | 4/2017 | Montalti et al. |
| 2017/0304759 A1 | 10/2017 | Foenss |
| 2018/0280857 A1 | 10/2018 | Ullrich |
| 2020/0121146 A1 * | 4/2020 | Ohlendorf ................. A47L 9/10 |

FOREIGN PATENT DOCUMENTS

| | | |
|---|---|---|
| CN | 203263298 U | 11/2013 |
| CN | 203647257 | 6/2014 |
| CN | 203678157 U | 7/2014 |
| CN | 106725113 A | 5/2017 |
| CN | 206296530 U | 7/2017 |
| CN | 110693386 A | 1/2020 |
| DE | 595686 C | 4/1934 |
| DE | 4138223 C1 | 2/1993 |
| DE | 10101218 A1 | 7/2002 |
| DE | 10101219 A1 | 7/2002 |
| DE | 102005035884 A1 | 2/2007 |
| DE | 202010012821 U1 | 12/2010 |
| DE | 202011002455 U1 | 3/2011 |
| DE | 202010009989 U1 | 2/2012 |
| DE | 102011075013 A1 | 10/2012 |
| DE | 102012003073 A1 | 8/2013 |
| DE | 102013008628 A1 | 11/2013 |
| DE | 10101219 C5 * | 8/2017 ......... B01D 46/0058 |
| EP | 130747 A2 | 1/1985 |
| EP | 0252265 A2 | 1/1988 |
| EP | 1010387 B1 | 6/2000 |
| EP | 1230973 A1 | 8/2002 |
| EP | 1269903 B1 | 1/2003 |
| EP | 1629762 B1 | 3/2006 |
| EP | 2011594 A2 | 1/2009 |
| EP | 2011992 B1 | 1/2009 |
| EP | 2196282 A1 | 6/2010 |
| EP | 2229856 A1 | 9/2010 |

(56) References Cited

FOREIGN PATENT DOCUMENTS

| | | | |
|---|---|---|---|
| EP | 2229857 | A2 | 9/2010 |
| EP | 2229859 | A1 | 9/2010 |
| EP | 2229861 | A2 | 9/2010 |
| EP | 2481522 | A2 | 8/2012 |
| EP | 2628427 | A2 | 8/2013 |
| EP | 2628428 | A2 | 8/2013 |
| EP | 2628431 | A2 | 8/2013 |
| EP | 2630902 | A1 | 8/2013 |
| EP | 2662011 | A1 | 11/2013 |
| EP | 2749193 | A1 | 7/2014 |
| GB | 2043483 | A | 10/1980 |
| WO | 8502528 | A1 | 6/1985 |
| WO | 2011150957 | A1 | 12/2011 |
| WO | 2011151219 | A1 | 12/2011 |
| WO | 2012130806 | A1 | 10/2012 |
| WO | 2017040124 | A1 | 3/2017 |
| WO | 2017040730 | A1 | 3/2017 |
| WO | 2019002032 | A1 | 1/2019 |

\* cited by examiner

PORTABLE DUST EXTRACTOR

CROSS-REFERENCE TO RELATED APPLICATIONS

This application claims priority to U.S. Provisional Patent Application No. 63/115,884 filed on Nov. 19, 2020, the entire contents of which are incorporated herein by reference.

FIELD OF THE DISCLOSURE

The present disclosure relates to dust extractors, and more particularly to portable dust extractors.

BACKGROUND OF THE DISCLOSURE

At a worksite, dust and debris may accumulate as operations are performed. A dust extractor may be used to vacuum up the dust and debris.

SUMMARY OF THE DISCLOSURE

In an embodiment of the disclosure a portable dust extractor is disclosed and includes a housing, a collection chamber in the housing, at least one suction source in fluid communication with the collection chamber, an inlet on the housing and leading to the collection chamber, a first filter chamber in the housing and in fluid communication with the collection chamber, wherein a first filter is disposed within the first filter chamber, a second filter chamber in the housing and in fluid communication with the collection chamber, the second filter chamber being separate from the first filter chamber, wherein a second filter is disposed within the second filter chamber, and a manifold system adjacent to the first filter chamber and the second filter chamber, wherein the manifold system is operable to permit air flow through the first filter and the second filter in a filter direction and operable to permit air flow through the one of the first filter and the second filter in a filter direction while permitting air flow through the other of the first filter and the second filter in a debris removal direction.

In a particular embodiment, the manifold system includes a first junction chamber in fluid communication with the first filter chamber, the first junction chamber including a suction opening leading to the suction source and an ambient air opening.

In another embodiment, the manifold system further includes a first plunger including a first sealing member and a second sealing member, the first plunger movable between a first position in which the first sealing member of the first plunger is spaced from the suction opening of the first junction chamber and the second sealing member of the first plunger seals the ambient air opening of the first junction chamber, and a second position in which the first sealing member of the first plunger seals the suction opening of the first junction chamber and the second sealing member of the first plunger is spaced from the ambient air opening of the first junction chamber.

In yet another embodiment, the first plunger is biased toward the first position via a spring.

In another embodiment, the manifold system further includes a first solenoid operably coupled to the first plunger wherein the first solenoid is activatable to move the first plunger from the first position to the second position.

In another particular embodiment, the manifold system further includes a second junction chamber in fluid communication with the second filter chamber, the second junction chamber including a suction opening leading to the suction source and an ambient air opening, the second junction chamber being separate from the first junction chamber.

In still another embodiment, the manifold system further includes a second plunger including a first sealing member and a second sealing member, the second plunger movable between a first position in which the first sealing member of the second plunger is spaced from the suction opening of the second junction chamber and the second sealing member of the second plunger seals the ambient air opening of the second junction chamber, and a second position in which the first sealing member of the second plunger seals the suction opening of the second junction chamber and the second sealing member of the second plunger is spaced from the ambient air opening of the second junction chamber.

In yet still another embodiment, the second plunger is biased toward the first position via a spring.

In another particular embodiment, the manifold system further includes a second solenoid operably coupled to the second plunger, wherein a second solenoid that is activatable to move the second plunger from the first position to the second position.

According to another embodiment of the disclosure, a portable dust extractor includes a housing, a collection chamber in the housing, at least one suction source in fluid communication with the collection chamber, an inlet on the housing and leading to the collection chamber, a first filter chamber in the housing and in fluid communication with the collection chamber, wherein a first filter is disposed within the first filter chamber, a second filter chamber in the housing and in fluid communication with the collection chamber, the second filter chamber being separate from the first filter chamber, wherein a second filter is disposed within the second filter chamber, and a manifold system adjacent to the first filter chamber and the second filter chamber, wherein the manifold system is operable to allow the portable dust extractor to extract dust via one of the first filter chamber and the second filter chamber while performing a filter cleaning operation within the other of the first filter chamber and the second chamber.

In yet another embodiment, the manifold system includes a first junction chamber in fluid communication with the first filter chamber, the first junction chamber including a suction opening leading to the suction source and an ambient air opening, and a second junction chamber in fluid communication with the second filter chamber, the second junction chamber including a suction opening leading to the suction source and an ambient air opening, the second junction chamber being separate from the first junction chamber.

In still another embodiment, the manifold system further includes a first plunger including a first sealing member and a second sealing member, the first plunger movable between a first position in which the first sealing member of the first plunger is spaced from the suction opening of the first junction chamber and the second sealing member of the first plunger seals the ambient air opening of the first junction chamber, and a second position in which the first sealing member of the first plunger seals the suction opening of the first junction chamber and the second sealing member of the first plunger is spaced from the ambient air opening of the first junction chamber, wherein the first plunger is biased toward the first position via a spring.

In another embodiment, the manifold system further includes a second plunger including a first sealing member and a second sealing member, the second plunger movable between a first position in which the first sealing member of the second plunger is spaced from the suction opening of the second junction chamber and the second sealing member of the second plunger seals the ambient air opening of the second junction chamber, and a second position in which the first sealing member of the second plunger seals the suction opening of the second junction chamber and the second sealing member of the second plunger is spaced from the ambient air opening of the second junction chamber, wherein the second plunger is biased toward the first position.

In still yet another embodiment, the manifold system further includes a first solenoid that is activatable to move the first plunger from its first position to its second position, and a second solenoid that is activatable to move the second plunger from its first position to its second position.

In another particular embodiment, the first filter is cleaned when the suction source is activated, the first solenoid is activated, and the second solenoid is deactivated, such that ambient air passes moves the ambient air opening of the first junction chamber and through the first filter, such that the ambient air moves dust and debris off a dirty side of the first filter, and wherein the second filter is cleaned when the suction source is activated, the second solenoid is activated, and the first solenoid is deactivated, such that ambient air moves through the ambient air opening of the second junction chamber and through the second filter, such that the ambient air moves dust and debris off a dirty side of the second filter.

In another embodiment, when the suction source is activated, the first solenoid is activated, and the second solenoid is deactivated, an airstream passes through the inlet, the dust collection chamber, the second filter chamber, the second filter, the second junction chamber, the suction opening of the second junction chamber and to the suction source.

In yet another embodiment, when the suction source is activated, the second solenoid is activated, and the first solenoid is deactivated, an airstream passes through the inlet, the dust collection chamber, the first filter chamber, the first filter, the first junction chamber, the suction opening of the first junction chamber and to the suction source.

According to yet another embodiment of the present disclosure, a portable dust extractor includes a housing, a collection chamber in the housing, at least one suction source in fluid communication with the collection chamber, an inlet on the housing and leading to the collection chamber, a first filter chamber in the housing and in fluid communication with the collection chamber, wherein a first filter is disposed within the first filter chamber, a second filter chamber in the housing and in fluid communication with the collection chamber, the second filter chamber being separate from the first filter chamber, wherein a second filter is disposed within the second filter chamber, a manifold system adjacent to the first filter chamber and the second filter chamber, wherein the manifold system includes a plurality of solenoids that are operable to control air flow through the first filter and the second filter, and a solenoid controller operatively coupled to the plurality of solenoids within the manifold system, wherein the solenoid controller is operable to initiate a first filter cleaning cycle in which air is permitted to flow through the first filter in a debris removal direction and air is permitted to flow through the second filter in a filter direction, and wherein the solenoid controller is operable to initiate a second filter cleaning cycle in which air is permitted to flow through the first filter in a filter direction and air is permitted to flow through the second filter in a debris removal direction.

In another particular embodiment, the manifold system includes a first junction chamber in fluid communication with the first filter chamber, the first junction chamber including a suction opening leading to the suction source and an ambient air opening, a first plunger including a first sealing member and a second sealing member, and a first solenoid operatively coupled to the first plunger.

In yet another embodiment, the first plunger is movable between a first position in which the first sealing member of the first plunger is spaced from the suction opening of the first junction chamber and the second sealing member of the first plunger seals the ambient air opening of the first junction chamber, and a second position in which the first sealing member of the first plunger seals the suction opening of the first junction chamber and the second sealing member of the first plunger is spaced from the ambient air opening of the first junction chamber.

In still another embodiment, the first plunger is biased toward the first position via a spring and the first solenoid is activatable to move the first plunger from the first position to the second position.

In another particular embodiment, the manifold system further includes a second junction chamber in fluid communication with the second filter chamber, the second junction chamber including a suction opening leading to the suction source and an ambient air opening, the second junction chamber being separate from the first junction chamber, a second plunger including a first sealing member and a second sealing member, and a second solenoid operatively coupled to the second plunger.

In another embodiment, the second plunger is movable between a first position in which the first sealing member of the second plunger is spaced from the suction opening of the second junction chamber and the second sealing member of the second plunger seals the ambient air opening of the second junction chamber, and a second position in which the first sealing member of the second plunger seals the suction opening of the second junction chamber and the second sealing member of the second plunger is spaced from the ambient air opening of the second junction chamber.

In yet still another embodiment, the second plunger is biased toward the first position via a spring and the second solenoid is activatable to move the second plunger from the first position to the second position.

In another embodiment, the first filter extends along a first filter plane, FP, that defines an acute angle, a, with respect to a horizontal plane, HP, that may be parallel to a surface on which the portable dust extractor is placed.

In still another embodiment, the second filter extends along a second filter plane, FP, that defines an acute angle, $\beta$, with respect to the horizontal plane, HP, that may be parallel to a surface on which the portable dust extractor is placed.

In another particular embodiment, $\alpha$ and $\beta$ are equal to each other.

In another embodiment, $\alpha$ and $\beta$ are be less than or equal to thirty-five degrees (35°).

In yet another embodiment, $\alpha$ and $\beta$ are greater than or equal to five degrees (5°).

In another embodiment, the suction source includes a direct current (DC) motor, an alternating current (AC) motor, or a combination thereof.

Other features and aspects of the disclosure will become apparent by consideration of the following detailed description and accompanying drawings.

Before any embodiments of the disclosed device are explained in detail, it is to be understood that the disclosed device is not limited in its application to the details of construction and the arrangement of components set forth in the following description or illustrated in the following drawings. The device is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
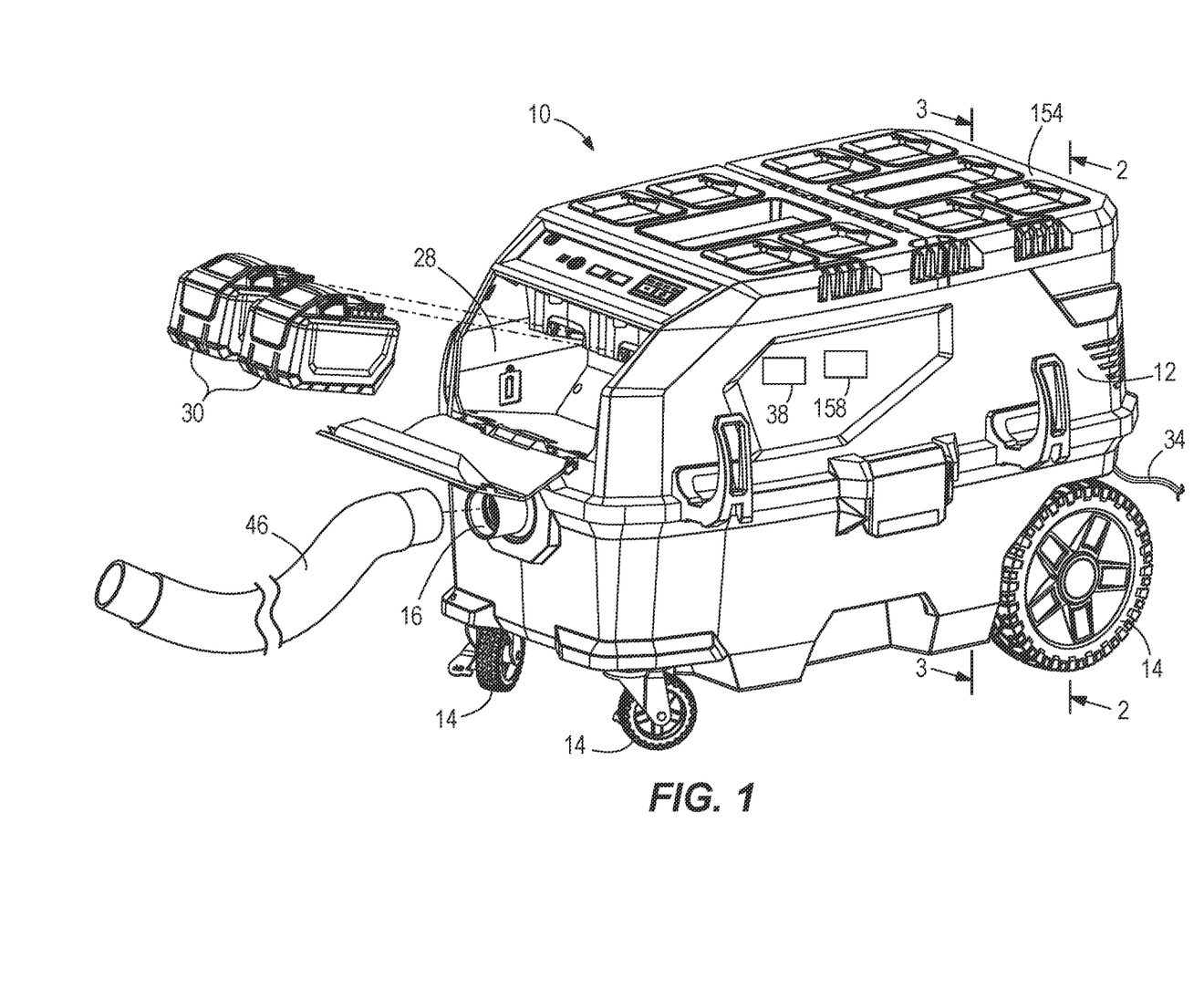
FIG. 1 is perspective view of a dust extractor in accordance with an embodiment of the present disclosure.

Referring initially to FIG. 1, a dust extractor is shown and is generally designated 10. As illustrated, the dust extractor 10 may include a housing 12. The dust extractor 10 may also include a plurality of wheels 14 rotatably coupled to the housing 12 to allow the extractor 10 to roll along the ground. Specifically, the dust extractor 10 may include two front wheels mounted on swivel forks and two rear wheels mounted on an axle. As such, each front wheel may rotate about two axes, e.g., a horizontal axis and a vertical axis. Moreover, the rear wheels may rotate about a single axis, e.g., a horizontal axis. During use, the front wheels may rotate and swivel and may be used to steer the dust extractor 10.

Figure 2:
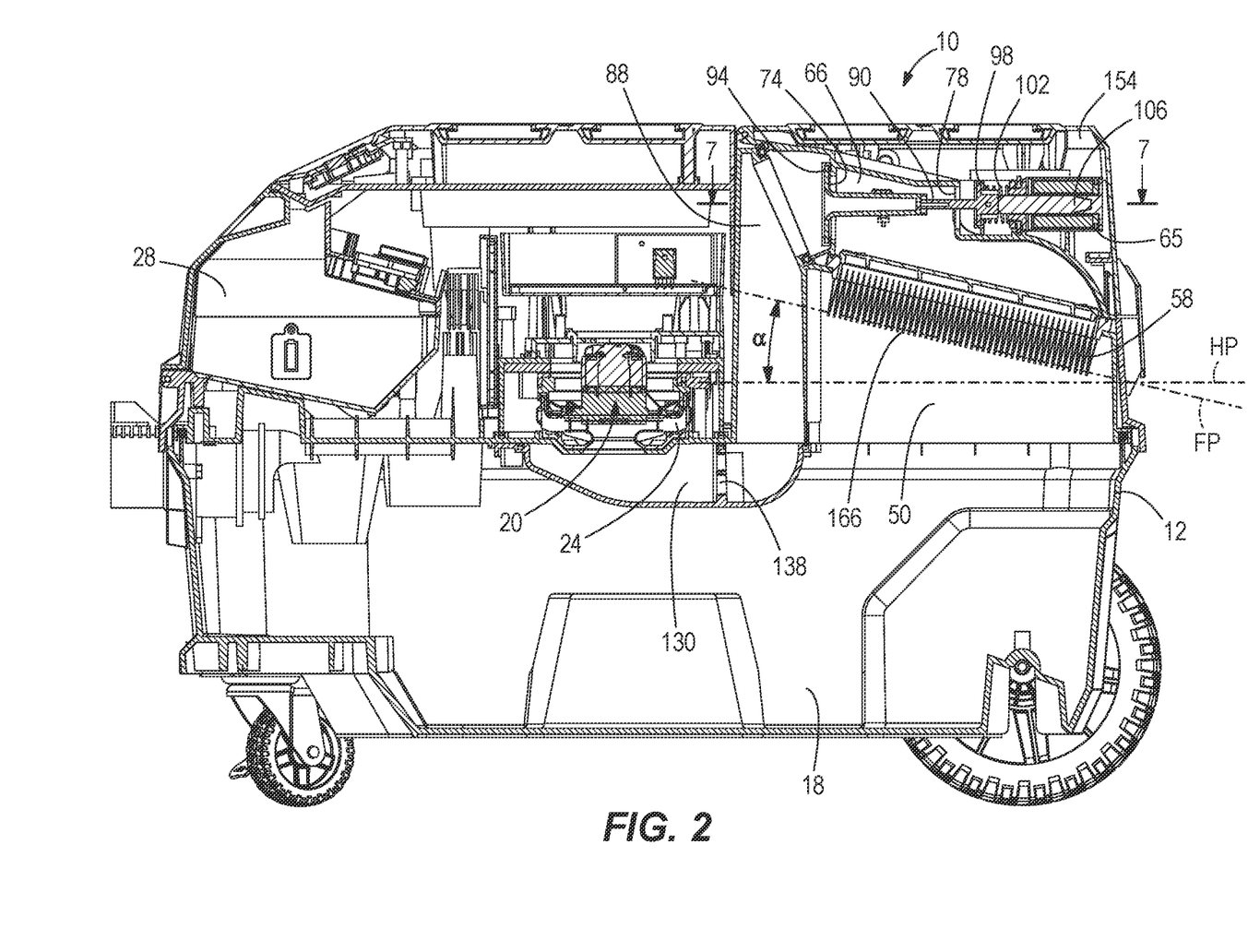
FIG. 2 is a cross-sectional view of the dust extractor of FIG. 1 taken along line 2-2 in FIG. 1.
Figure 3:
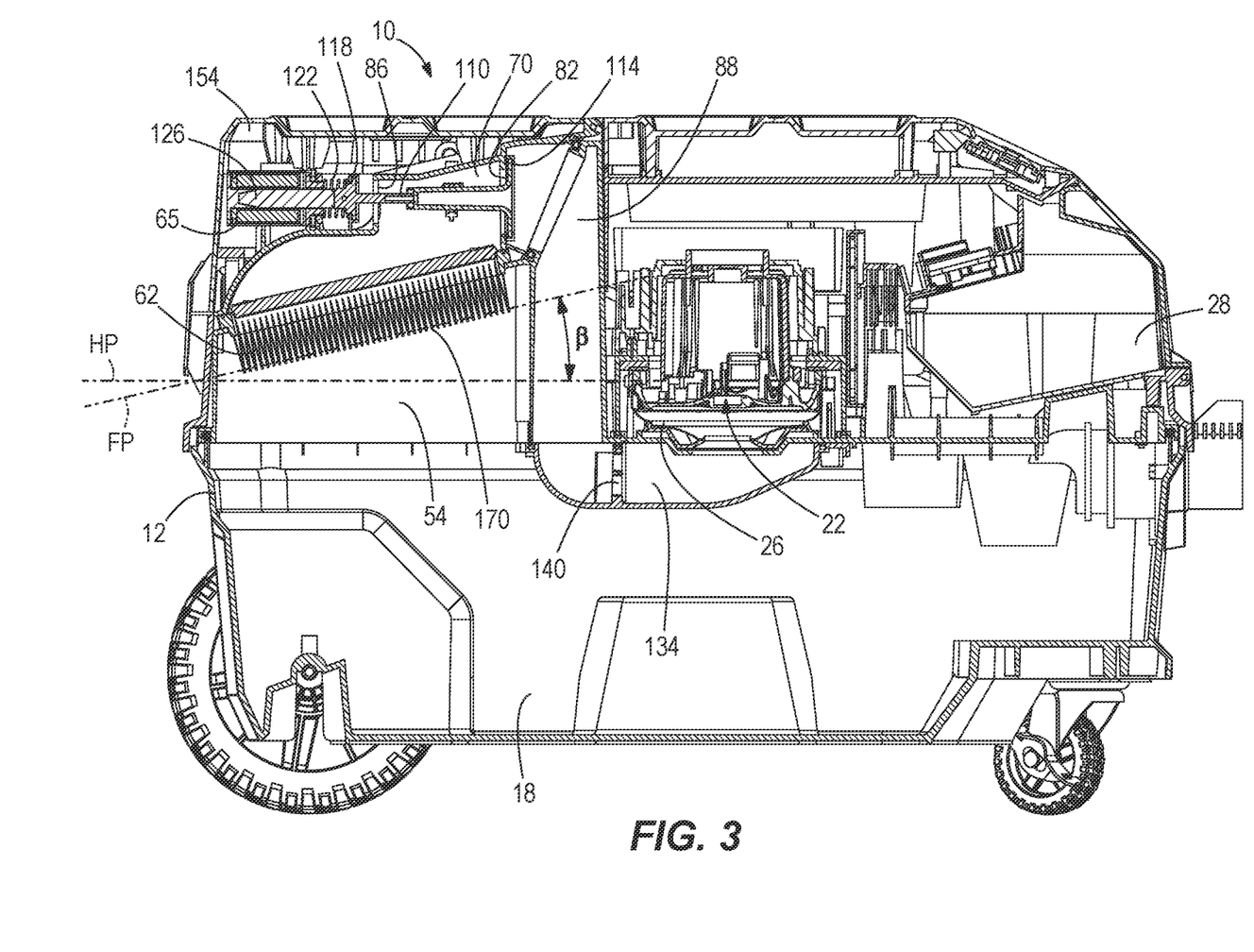
FIG. 3 is a cross-sectional view of the dust extractor of FIG. 1 taken along line 3-3 in FIG. 1.

FIG. 1 indicates that the dust extractor 10 may also include an inlet 16. The inlet 16 may lead to a collection chamber 18 within the housing 12, as illustrated in FIG. 2. FIG. 2 also shows that the dust extractor 10 may also a first, direct current (DC) motor 20 disposed therein. The DC motor 20 may include a first turbine 24 that may create suction in order to draw dust and debris through the inlet 16 and into the collection chamber 18. FIG. 3 indicates that the dust extractor 10 may further include a second, alternating current (AC) motor 22. The AC motor 22 may include a second turbine 26 that may also create suction to draw debris through the inlet 16 and into the collection chamber 18. Accordingly, the DC motor 20 and the first turbine 24 of the DC motor 20 may be a first suction source and the AC motor 22 and the second turbine 26 of the AC motor may be a second suction source. Each suction source may be in fluid communication with the collection chamber 18 and may provide suction through the collection chamber 18.

As shown, the dust extractor 10 may include a battery receptacle 28 for receiving a battery pack 30. When the battery pack 30 is arranged in the battery receptacle 28, the battery pack 30 can provide power to the DC motor 20. The dust extractor also includes a cord 34, or an outlet, for a receiving a cord, for plugging into an AC power socket, such as a standard wall socket, for providing power to the AC motor 22.

Figure 5:
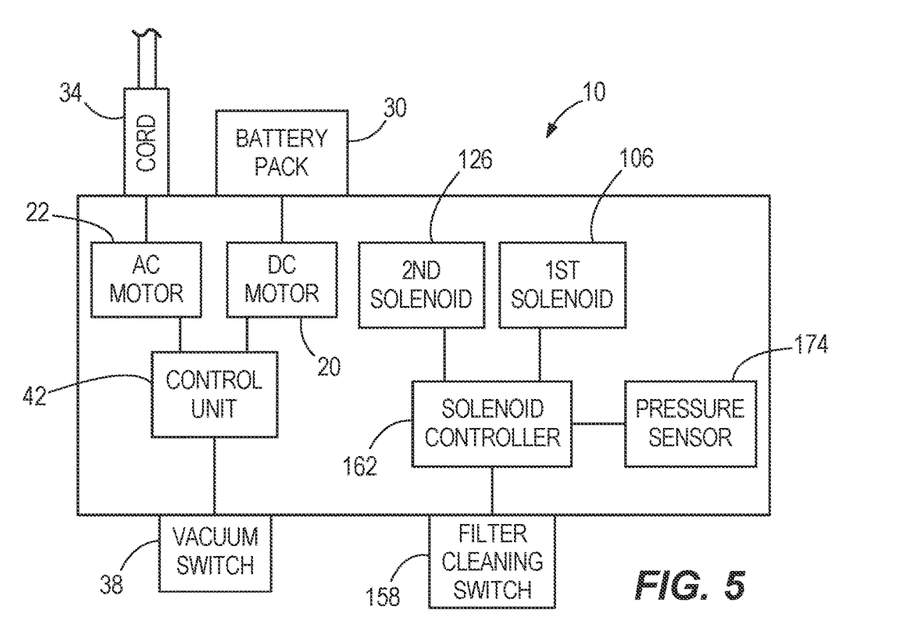
FIG. 5 is a schematic view of the dust extractor of FIG. 1.
Figure 6:
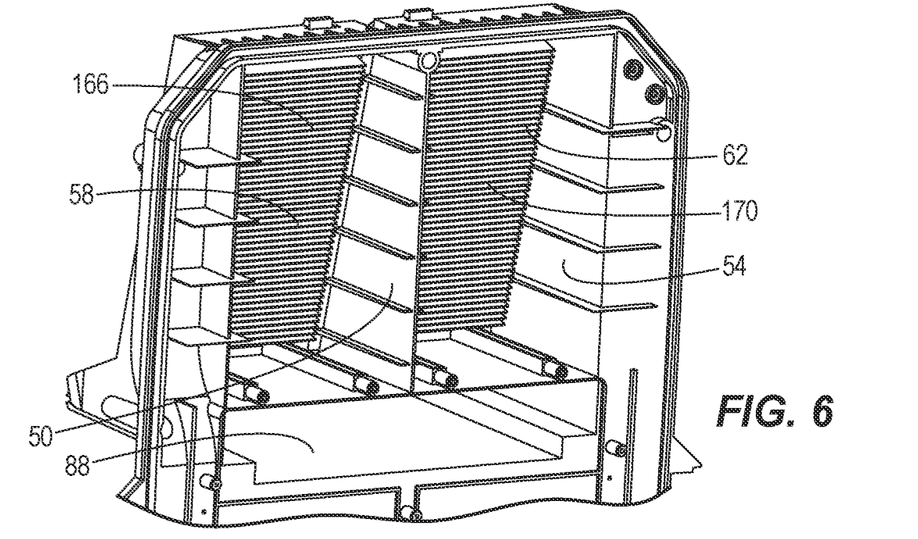
FIG. 6 is a perspective view of the dust extractor of FIG. 1, with portions removed.

As illustrated in FIG. 1, The dust extractor 10 may also include a vacuum switch 38 for activating one of the DC or AC motors 20, 22 via a control unit 42 shown schematically in FIG. 5. When the cord 34 is plugged into the AC power socket, the battery pack 30 is not in the battery receptacle 28, and the vacuum switch 38 is set to an "ON" setting, the control unit 42 may only activate the AC motor 22, which receives power via the cord 32. When the cord 34 is plugged into the AC power socket, the battery pack 30 is in the battery receptacle 28, and the vacuum switch 38, set to an "ON" setting, the control unit 42 may only activate the AC motor 22, which receives power via the cord 32. When the cord 34 is not plugged into the AC power socket, the battery pack 30 is in the battery receptacle 28, and the vacuum switch 38 is set to an "ON" setting, the control unit 42 may only activate only the DC motor 20, which receives power from the battery pack 30. Thus, during a vacuuming operation of the dust extractor 10, only one of the DC and AC motors 20, 22 may be activated at any given time.

FIG. 1 indicates that a hose 46 may be attachable to the inlet 16 to be used to vacuum dust and debris at a worksite. As illustrated in FIGS. 2, 3, 6, and 7, the dust extractor 10 may include a first filter chamber 50 and a second filter chamber 54. The filter chambers 50, 54 are separate from each other and therefor, the filter chambers 50, 54 are separately in fluid communication with the collection chamber 18. Moreover, the first filter chamber 50 may include a first filter 58 and the second filter chamber 54 may include a second filter 62.

As shown in FIG. 2 the first filter 58 may extend along a first filter plane, FP, that defines an acute angle, a, with respect to a horizontal plane, HP, that may be parallel to a surface on which the wheels 14 rest, i.e., a surface on which the portable dust extractor 10 is placed. Similarly, as depicted in FIG. 3, the second filter 62 may extend along a second filter plane, FP, that defines an acute angle, β, with respect to a horizontal plane, HP, that may be parallel to a surface on which the wheels 14 rest. In a particular embodiment, α and β are equal. Further, in an embodiment, α and β may be less than or equal to thirty-five degrees (35°), less than or equal to thirty degrees (30°), less than or equal to twenty-five degrees (25°), or less than or equal to twenty degrees (20°). In another embodiment, α and β may be greater than or equal to five degrees (5°), greater than or equal to seven-and-a-half degrees (7.5°), greater than or equal to ten degrees (10°), greater than or equal to twelve-and-a-half degrees (12.5°), or greater than or equal to fifteen degrees (15°). It is to be understood that α and β may be within range between, and including, any of the maximum and minimum values of α and β disclosed herein.

Figure 7:
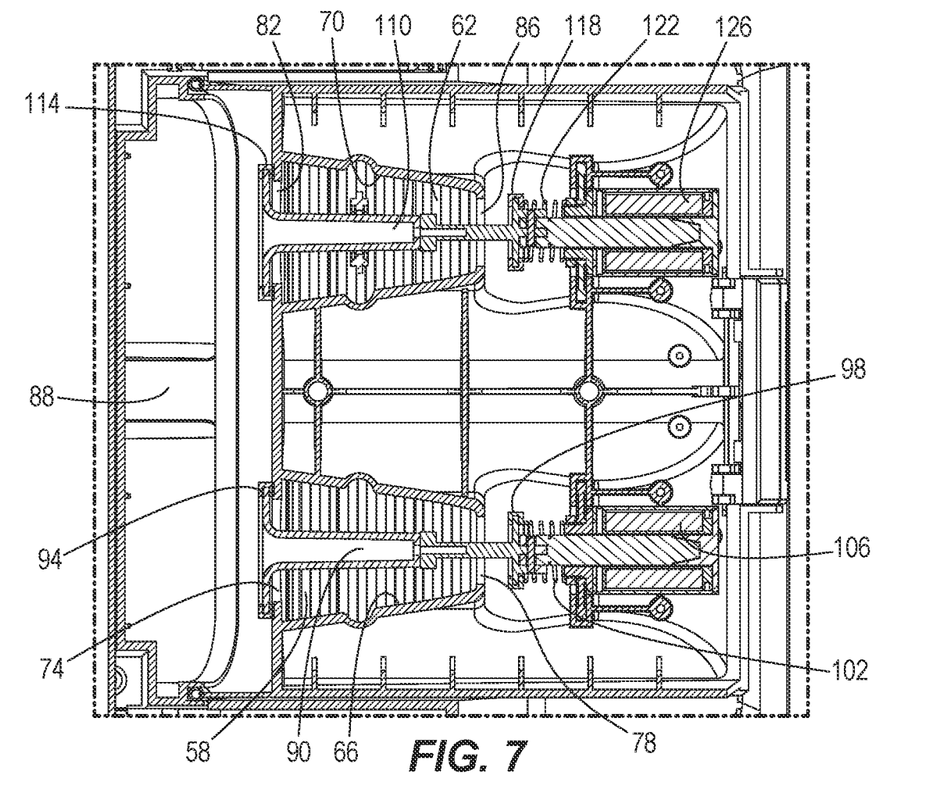
FIG. 7 is a cross-sectional view of the dust extractor of FIG. 1 taken along line 7-7 in FIG. 2.

FIG. 2 and FIG. 7 show that the dust extractor 10 may include a manifold system 65 disposed above the filter chambers 50, 54. As illustrated, the manifold system 65 may include a first junction chamber 66 disposed above the first filter 58. Moreover, as shown, the first junction chamber 66 may include a suction opening 74 and an ambient air opening 78. FIG. 3 and FIG. 7 indicate that the manifold system 65 of the dust extractor 10 may include a second junction chamber 70 disposed above the second filter 62. Further, as illustrated, the second junction chamber 70 may include a suction opening 82 and an ambient air opening 86. In an embodiment, and as shown in FIGS. 2, 3, and 7, the suction openings 74, 82 of the first and section junction chambers 66, 70 respectively and selectively may allow fluid communication between the first and second junction chambers 66, 70, and a common transition conduit 88 adjacent to, an in fluid communication with, the manifold system 65, as described in further detail below.

As illustrated in FIGS. 2 and 7, the manifold system 65 of the dust extractor 10 also may include a first plunger 90 slidably disposed within the first junction chamber 66. The first plunger may be operable to alternatively block one of the suction opening 74 and ambient air opening 78 of the first junction chamber 66. Specifically, the first plunger 90 may include a first seal member 94 configured to selectively block the suction opening 74 and a second seal member 98 configured to selectively bock the ambient air opening 78. The first plunger 90 may be biased by a first spring 102 to a first position, in which the second seal member 98 is sealed against the ambient air opening 78 to block, or otherwise inhibit, communication of ambient air into the first junction chamber 66 via the ambient air opening 78. Also, in the first position, the first seal member 94 may be spaced away from the suction opening 74 to allow fluid communication between the first junction chamber 66 and the common transition conduit 88 via the suction opening 74.

The manifold system 65 may further include a first solenoid 106 operably coupled to the first plunger 90. In response to activation of the first solenoid 106, the first plunger 90 may be operable to be moved by the first solenoid 106 against the force of the first spring 102 toward the first solenoid 106 into a second position, shown in FIG. 2. In the second position, the second seal member 98 may be spaced away from the ambient air opening 78 to permit, or otherwise allow, communication of ambient air into the first junction chamber 66 via the ambient air opening 78. Also, in the second position, as shown in FIG. 2, the first seal member 94 may be sealed against the suction opening 74, to block, or otherwise inhibit, fluid communication between the first junction chamber 66 and the common transition conduit 88.

As illustrated in FIGS. 3 and 7, the manifold system 65 of the dust extractor 10 may include a second plunger 110 slidably disposed within the second junction chamber 70. The second plunger 110 may be operable to alternatively block one of the suction opening 82 and ambient air opening 86 of the second junction chamber 70. Specifically, the second plunger 110 may include a first seal member 114 configured to selectively block the suction opening 82 and a second seal member 118 configured to selectively bock the ambient air opening 86. The second plunger 110 may be biased by a second spring 122 to a first position, in which the second seal member 118 of the second plunger 110 is sealed against the ambient air opening 86 to inhibit, or otherwise block, fluid communication of ambient air into the second junction chamber 70 via the ambient air opening 86. In the first position, the first seal member 114 may be spaced from the suction opening 82 to permit, or otherwise allow, fluid communication between the second junction chamber 70 and the common transition conduit 88 via the suction opening 82.

As shown in FIG. 3, the manifold system 65 may further include a second solenoid 126 operably coupled to the second plunger 110. In response to activation of the second solenoid 126, the second plunger 110 may be operable to be moved by the second solenoid 126 against the force of the second spring 122 toward the second solenoid 126 into a second position, shown in FIG. 3. In the second position, the second seal member 118 may be spaced from the ambient air opening 86, to permit, or otherwise allow, communication of ambient air into the second junction chamber 70 via the ambient air opening 86. Also, in the second position, as depicted in FIG. 3, the first seal member 114 may be sealed against the suction opening 82, such that fluid communication between the second junction chamber 70 and the common transition conduit 88 may be inhibited.

Figure 4:
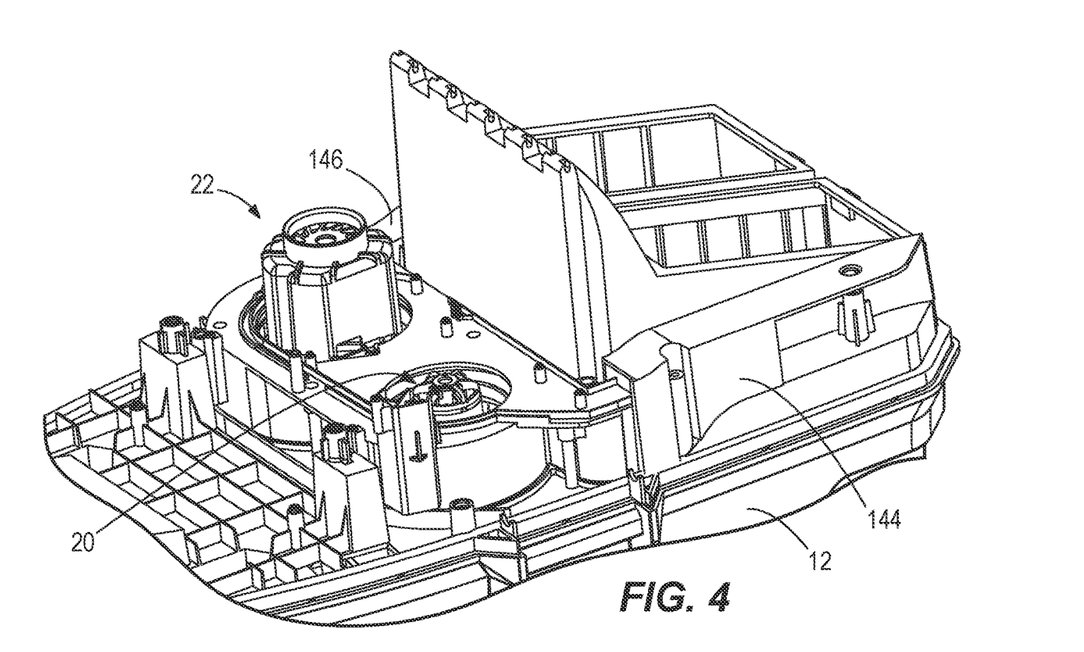
FIG. 4 is a perspective view of the dust extractor of FIG. 1 with portions removed.
Figure 8:
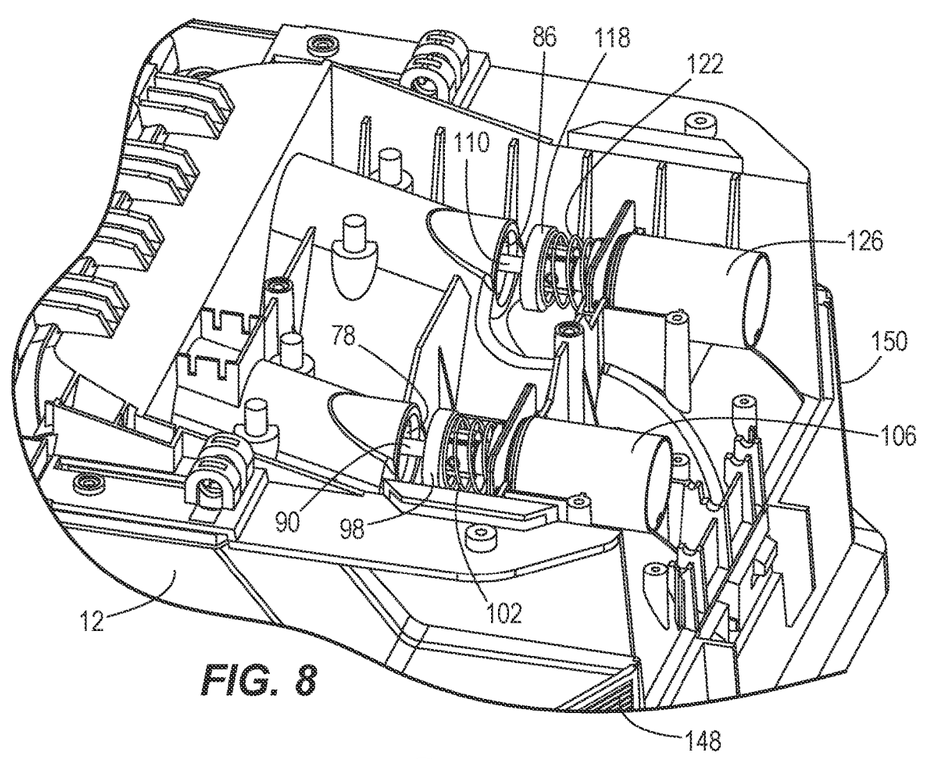
FIG. 8 is a perspective view of the dust extractor of FIG. 1, with portions removed.
Figure 9:
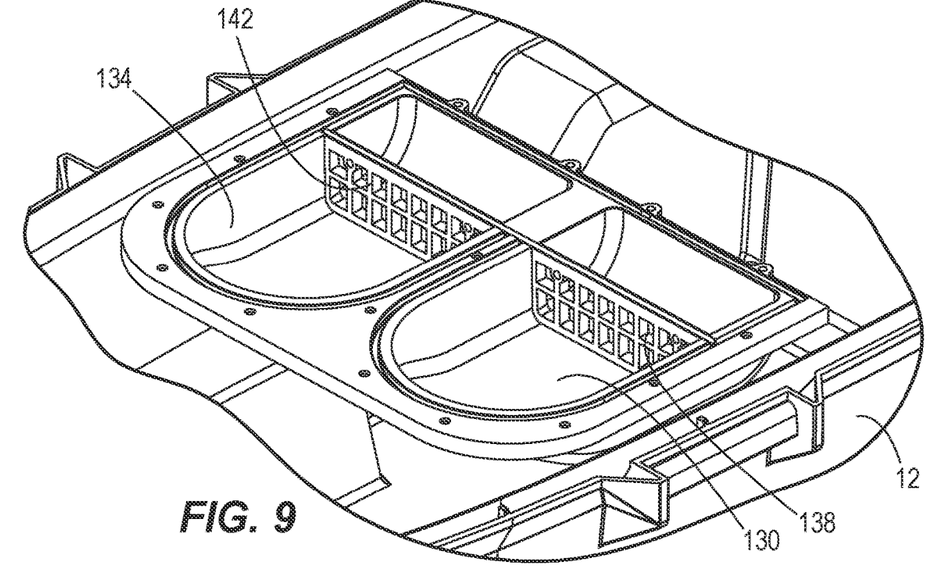
FIG. 9 is a perspective view of the dust extractor of FIG. 1, with portions removed.

As shown in FIGS. 2 and 3, the common transition conduit 88 may lead to separate first and second motor suction conduits 130, 134 that lead, respectively, to the first and second motors 20, 22. FIG. 2 shows that the dust extractor 10 may include a first secondary filter 138 that may be disposed, or otherwise arranged, within the first motor suction conduit 130. FIG. 3 indicates that the dust extractor 10 may include a second secondary filter 140 that may be disposed, or otherwise installed along, or within, the second motor suction conduits 134. As shown in FIG. 4, the first and second exhaust conduits 144, 146 may be in fluid communication with the first motor 20 and the second motors 22. Moreover, as shown in FIG. 8, the first and second exhaust conduits 144, 146 may extend to first and second exhaust vents 148, 150, respectively, that are formed in the housing 12 and may provide fluid communication with ambient air around the dust extractor. As further illustrated in FIGS. 1 through 3, the dust extractor 10 may include a lid 154 that may be disposed on top of the housing 12 of the dust extractor 10. In an embodiment, the lid 154 may be pivotally moveable between an open position (not shown) and a closed position, illustrated in FIGS. 1 through 3, in order to provide selective access to the first and second solenoids 106, 126 within the housing 12.

As shown in FIG. 1, the dust extractor 10 may include a filter cleaning switch 158 that may be used to activate a filter cleaning sequence that may be performed by the manifold system 65 (described in more detail below) via a solenoid controller 162 shown schematically in FIG. 5. The solenoid controller 162 may be operatively coupled in electrical communication with each of the first and second solenoids 106, 126 of the manifold system 65. When the filter cleaning switch 158 is set to an "OFF" position, neither of the solenoids 106, 126 are capable of being activated, such that neither of the first or second filters 58, 62 can be cleaned. When the filter cleaning switch 158 is set to an "ON" position, the first and second solenoids 106, 126 may be configured to be alternately activated by the solenoid controller 162, such that the first or second filters 58, 62 can be cleaned with the filter cleaning sequence, as described below.

In operation, it may be desirable to use the dust extractor 10 to vacuum dust or debris at a work site in a "vacuum only" mode, in which the first and second solenoids 106, 126 within the manifold system 65 are not activated and thus, the first and second filters 58, 62 are not cleaned. Thus, the hose 46 may be attached to the inlet 16 and the vacuum switch 38 may be set to "ON", while the filter cleaning switch 158 remains in the "OFF" position. Assuming the battery pack 30 is in the receptacle 28 and the cord 34 is plugged into an AC power socket, the control unit 42 may activate only the AC motor 22, which may drive the second turbine 26 to create suction. Thus, during AC operation, an airstream containing dust and debris may be drawn in through the hose 46 and inlet 16 to the collection chamber 18. Larger dust and debris may settle in the dust collection chamber 18 while the airstream continues up through both of first and second filter chambers 50, 54, passing through both first and second filters 58, 62, such that smaller particulate matter in the airstream may be trapped, or otherwise, caught in the first and second filters 58, 62.

After passing through the first and second filters 58, 62, the airstream may enter each of the first and second junction chambers 66, 70. Because the filter cleaning switch 158 is in the "OFF" position, neither of the first or second solenoids 106, 126 may be activated, so both of the first and second plungers 90, 110 may remain biased into their respective first positions. Therefore, the airstream may exit the first and second junction chambers 66, 70, respectively, via their respective suction openings 74, 82. Further, the airstream may continue through the common transition conduit 88 and into the second motor suction conduit 134, where the airstream may pass through the second secondary filter 140. The second secondary filter 140 may further catch, or otherwise filter, particulate matter from the airstream. The airstream may then be exhausted by the AC motor 22 through the second exhaust conduit 146 and second exhaust vent 150 on the housing 12.

In the above example of "vacuum only" mode, if the cord 34 is not plugged the AC power socket while the battery 30 is in the receptacle 28, the control unit 42 may activate the DC motor 20 instead of the AC motor 22. This DC operation may be substantially identical to the AC operation—except that after passing through the common transition conduit 88, the airstream may be drawn into the first motor suction conduit 130, where it would pass through the first secondary filter 138. Thereafter, the airstream may be exhausted by the DC motor 20 through the first exhaust conduit 144 and first exhaust vent 148 on the housing 12.

While using the dust extractor 10 to vacuum, it may be desirable to clean the first and second filters 58, 62. As such, the filter cleaning switch 158 may be set to "ON" while the vacuum switch 38 remains in the "ON" position, such that the AC motor 22 may continue to run and create suction in order to draw the airstream through the dust extractor 10, as described above. In response to the filter cleaning switch 158 being set to "ON", the solenoid controller 162 may begin the filter cleaning sequence by starting a timer. Until the timer expires, the dust extractor 10 may operate in "vacuum only" mode—i.e., neither of the first and second solenoids 106, 126 are activated and accordingly, the first and second filters 58, 62 may not be cleaned. In a particular embodiment according to the disclosure, the timer may be thirty seconds (30 s). However, it is to be understood that the timer may be any reasonable time, e.g., greater than or equal to ten seconds (10 s), greater than or equal to fifteen seconds (15 s), greater than or equal to twenty seconds (20 sec), greater than or equal to twenty-five seconds (25 sec), or greater than or equal to thirty seconds (30 sec). In another embodiment, the timer may be less than or equal to sixty seconds (60 sec), such as less than or equal to fifty-five seconds (55 sec), less than or equal to fifty seconds (50 sec), less than or equal to forty-five seconds (45 sec), less than or equal to forty seconds (40 sec), or less than or equal to thirty-five seconds (35 sec). It is to be understood that the timer may be within a range between, and including, any of the minimum and maximum values for the timer disclosed herein.

Once the timer expires, the solenoid controller 162 may initiate a first filter 58 cleaning cycle. During the first filter 58 cleaning cycle, the second solenoid 126 may remain deactivated, such that the second plunger 110 may remain biased to the first position, in which the second seal member 118 of the second plunger 110 is sealed against the ambient air opening 86, such that communication of ambient air into the second junction chamber 70 via the ambient air opening 86 is inhibited. Thus, during the first filter 58 cleaning cycle, the airstream may continue to be suctioned up through the second filter chamber 54 and may pass through the second filter 62 and the second junction chamber 70 before the airstream may exit the second junction chamber 70 via the suction opening 82. Thereafter, the airstream may continue through the common transition conduit 88, into the second motor suction conduit 134, before the airstream may be exhausted by the AC motor 22 through the second exhaust conduit 146 and second exhaust vent 150 on the housing 12.

During the first filter 58 cleaning cycle, the first solenoid 106 may be activated and deactivated by the solenoid controller 162, in sequence, three times total and each activation period and deactivation period may last a predetermined time interval. In some embodiments, the first filter 58 cleaning cycle may include more or fewer than three activation/deactivation periods. In some embodiments, the time interval is 0.5 seconds, such that during the first filter 58 cleaning cycle, the first solenoid may be activated 0.5 seconds, then deactivated for 0.5 seconds, then activated for 0.5 seconds, then deactivated for 0.5 seconds, then activated for 0.5 seconds, then deactivated for 0.5 seconds. However, in a particular embodiment, the time interval may be greater than or equal to 0.10 seconds, greater than or equal to 0.15 seconds, greater than or equal to 0.20 seconds, greater than or equal to 0.25 seconds, greater than or equal to 0.30 seconds, greater than or equal to 0.35 seconds, greater than or equal to 0.40 seconds, greater than or equal to 0.45 seconds, or greater than or equal to 0.50 seconds. In another embodiment, the timer may be less than or equal to 1.00 seconds, such as less than or equal to 0.95 seconds, less than or equal to 0.90 seconds, less than or equal to 0.85 seconds, less than or equal to 0.80 seconds, or less than or equal to 0.75 seconds, less than or equal to 0.70 seconds, less than or equal to 0.65 seconds, less than or equal to 0.60 seconds, or less than or equal to 0.55 seconds. It is to be understood that the time interval may be within a range between, and including, any of the minimum and maximum values for the time interval disclosed herein.

In the moments (i.e., the 0.5 second time intervals) that the first solenoid 106 is activated, the first plunger 90 may be moved to the second position, such that the suction opening 74 of the first junction chamber 66 is sealed by the first seal member 94 of the first plunger 90, and the ambient air opening 78 of the first junction chamber 66 is opened as the second seal member 98 of the first plunger 90 becomes spaced therefrom. As such, while the first solenoid 106 is activated, the airstream may no longer be suctioned up through the first filter chamber 50. Moreover, because the pressure in the first filter chamber 50 and the first junction chamber 66 is lower than ambient air pressure, ambient air may rush into the first junction chamber 66 through the ambient air opening 78 in the first junction chamber 66 and down through the first filter 58. The movement of the ambient air may thereby remove, or otherwise blast off, dust and debris that may be entrained on a bottom (dirty) side 166 of the first filter 58. As such, the first filter 58 may be cleaned by the flow of ambient air. By cycling between activation and deactivation of the first solenoid 106, the first filter 58 may be "pulse cleaned" during the first filter 58 cleaning cycle, allowing three total pulses, or blasts, of ambient air, to rush through and blast debris off the bottom side 166 of the first filter 58, corresponding to the three times that the first solenoid 106 is activated.

Once the first filter 58 cleaning cycle has ended, the filter cleaning sequence again starts the timer. Until the timer expires, the dust extractor 10 again may operate in "vacuum only" mode—i.e., neither of the first and second solenoids 106, 126 are activated and thus, the first and second filters 58, 62 are not cleaned.

Once the timer expires, the solenoid controller 162 may initiate a second filter 62 cleaning cycle. During the second filter 62 cleaning cycle, the first solenoid 106 may remain deactivated, such that first plunger 90 is biased to its first position. Thus, the airstream may be suctioned up through the first filter chamber 50 and pass through the first filter 58 and the first junction chamber 66. Then, the airstream may exit the first junction chamber 66 via the suction opening 74 before the airstream continues through the common transition conduit 88 into the second motor suction conduit 134. Finally, the airstream may be exhausted by the AC motor 22 through the second exhaust conduit 146 and second exhaust vent 150 on the housing 12.

During the second filter 62 cleaning cycle, the second solenoid 126 may be activated and deactivated by the solenoid controller 162, in sequence, three times total, with each activation and deactivation lasting the time interval. In the moments (i.e., the 0.5 second time intervals) that the second solenoid 126 is activated, the second plunger 110 may be moved to its second position, such that the suction opening 82 of the second junction chamber 70 is sealed by the first seal member 114 of the second plunger 110, and the ambient air opening 86 of the second junction chamber 70 is opened as the second seal member 118 of the second plunger 110 becomes spaced therefrom. Thus, the airstream may no longer be suctioned up through the second filter chamber 54. Further, because the pressure in the second filter chamber 54 and the second junction chamber 70 is lower than ambient air pressure, ambient air may rush into the second junction chamber 70 through the ambient air opening 86 and down through the second filter 62 in order to blast off, or otherwise clear, dust and debris that may have become entrained on a bottom (dirty) side 170 of the second filter 62. As such, that the second filter 62 may be cleaned by this ambient air flow. By cycling between activation and deactivation of the second solenoid 126, the second filter 62 may be "pulse cleaned" during the second filter 62 cleaning cycle, allowing three total pulses, or blasts, of ambient air, to rush through and blast debris off the bottom side 170 of the second filter 62, corresponding to the three times that the second solenoid 126 is activated.

Once the second filter 62 cleaning cycle has ended, the filter cleaning sequence is complete. Thus, one instance of the filter cleaning sequence involves 30 seconds of vacuum only mode, 3 seconds of the first filter 58 cleaning cycle, 30 seconds of vacuum only mode, and 3 seconds of the second filter 62 cleaning cycle. Once the filter cleaning sequence is complete, the solenoid controller 162 begins a subsequent instance of the filter cleaning sequence. Thus, as long as the filter cleaning switch 158 is set to "ON" while the vacuum switch 38 remains in the "ON" position, the solenoid controller 162 will continue to repeatedly initiate filter cleaning sequences, to alternately clean the first and second filters 58, 62 as described above.

In some embodiments, the solenoid controller 162 may be in electrical communication with a pressure sensor 174, as shown in FIG. 5, that is arranged downstream of the first and second filters 58, 62 and upstream of the DC and AC motors 20, 22. The pressure sensor 174 may be configured to measure an airflow rate of the airstream after the airstream has passed the first and second filters 58, 62 and is moving towards the first and second motors 20, 22. If the filter cleaning switch 158 and the vacuum switch 38 are both set to "ON", in response to the pressure sensor 174 detecting that the airflow rate is below a predetermined airflow threshold rate, which may be indicative that one or both of the first and second filters 58, 62 is clogged, the solenoid controller 162 may reduce the duration of the timer (e.g., making it less than 30 seconds). Thus, the solenoid controller 162 will continue to repeatedly initiate filter cleaning sequences as described above, except that, because the duration of the timer is reduced, each filter 58, 62 may be alternatively cleaned more frequently than when the pressure sensor 174 detects that the airflow rate is equal to or above the predetermined airflow threshold rate. In some embodiments, both the filter cleaning switch 158 and the vacuum switch 38 can be controlled wirelessly, e.g. from a smart phone.

Accordingly, the manifold system 65 is operable to permit air flow through both the first filter 58 and the second filter 62 in a filter direction and operable to permit air flow through the one of the first filter 58 and the second filter 62 in a filter direction while simultaneously permitting air flow through the other of the first filter 58 and the second filter 62 in a debris removal direction. It is to be understood that as air flows through the filters 58, 62 in the filter direction, dust and debris within the airstream may be filtered from the airstream and trapped within the filters 58, 62 or within the collection chamber 18. Moreover, as air flows in the debris removal direction, which opposite the filter direction, the air can blow, or otherwise, remove dust and debris trapped in the filters 58, 62. In another aspect, the manifold system 65 is operable to allow the portable dust extractor 10 to extract dust via one of the first filter chamber 50 and the second filter chamber 54 while performing a filter cleaning operation within the other of the first filter chamber 50 and the second chamber 54 to clean a respective filter 58, 62 disposed therein. Moreover, the solenoid controller 162 may be operatively coupled to the plurality of solenoids 106, 126 within the manifold system 65. Specifically, wherein the solenoid controller 162 may be operable to initiate a first filter cleaning cycle in which air is permitted to flow through the first filter 58 in a debris removal direction and air is permitted to flow through the second filter 62 in a filter direction. Further, the solenoid controller 162 may be operable to initiate a second filter cleaning cycle in which air is permitted to flow through the first filter 58 in a filter direction and air is permitted to flow through the second filter 62 in a debris removal direction.

Although the disclosed device has been described in detail with reference to certain preferred embodiments, variations and modifications exist within the scope and spirit of one or more independent aspects of the device as described.

What is claimed is:
1. A portable dust extractor comprising:
   a housing;
   a collection chamber in the housing;
   an inlet on the housing and leading to the collection chamber;
   a direct current (DC) motor having a first turbine to create a first suction source in fluid communication with the collection chamber in order to draw dust and debris through the inlet and into the collection chamber;
   an alternating current (AC) motor parallel to the DC motor, the AC motor having a second turbine to create a second suction source in fluid communication with the collection chamber in order to draw dust and debris through the inlet and into the collection chamber;
   a first filter chamber in the housing and in fluid communication with the collection chamber, wherein a first filter is disposed within the first filter chamber;
   a second filter chamber in the housing and in fluid communication with the collection chamber, the sec- ond filter chamber being separate from the first filter chamber, wherein a second filter is disposed within the second filter chamber;

a manifold system adjacent to the first filter chamber and the second filter chamber, wherein the manifold system is operable to permit air flow through the first filter and the second filter in a filter direction and operable to permit air flow through the one of the first filter and the second filter in a filter direction while simultaneously permitting air flow through the other of the first filter and the second filter in a debris removal direction;

a battery receptacle configured to be connected to a battery pack;

an AC power input configured to be connected to an AC power source; and a control unit in operable communication with the AC motor, the DC motor, and a vacuum switch having an on position, wherein the control unit is configured to activate the AC motor upon the vacuum switch being placed in the on position, the AC power input being attached to the AC power source, and the battery receptacle not having a battery connected thereto, wherein the control unit is configured to activate the AC motor upon the vacuum switch being placed in the on position, the AC power input being attached to the AC power source, and the battery receptacle having a battery connected thereto, and wherein the control unit is configured to activate the DC motor upon the vacuum switch being placed in the on position, the AC power input not being attached to the AC power source, and the battery receptacle having a battery connected thereto.

2. The portable dust extractor of claim 1, wherein the manifold system further comprises a first junction chamber in fluid communication with the first filter chamber, the first junction chamber including a suction opening leading to the suction source and an ambient air opening.

3. The portable dust extractor of claim 2, wherein the manifold system further comprises a first plunger including a first sealing member and a second sealing member, the first plunger movable between a first position in which the first sealing member of the first plunger is spaced from the suction opening of the first junction chamber and the second sealing member of the first plunger seals the ambient air opening of the first junction chamber, and a second position in which the first sealing member of the first plunger seals the suction opening of the first junction chamber and the second sealing member of the first plunger is spaced from the ambient air opening of the first junction chamber.

4. The portable dust extractor of claim 3, wherein the manifold system further comprises a first solenoid operably coupled to the first plunger, wherein the first solenoid is activatable to move the first plunger from the first position to the second position.

5. The portable dust extractor of claim 2, wherein the manifold system further comprises a second junction chamber in fluid communication with the second filter chamber, the second junction chamber including a suction opening leading to the suction source and an ambient air opening, the second junction chamber being separate from the first junction chamber.

6. The portable dust extractor of claim 5, wherein the manifold system further comprises a second plunger including a first sealing member and a second sealing member, the second plunger movable between a first position in which the first sealing member of the second plunger is spaced from the suction opening of the second junction chamber and the second sealing member of the second plunger seals the ambient air opening of the second junction chamber, and a second position in which the first sealing member of the second plunger seals the suction opening of the second junction chamber and the second sealing member of the second plunger is spaced from the ambient air opening of the second junction chamber.

7. The portable dust extractor of claim 6, wherein the manifold system further comprises a second solenoid operably coupled to the second plunger, wherein the second solenoid is activatable to move the second plunger from the first position to the second position.

8. A portable dust extractor comprising:

a housing;

a collection chamber in the housing;

an inlet on the housing and leading to the collection chamber;

a direct current (DC) motor having a first turbine to create a first suction source in fluid communication with the collection chamber in order to draw dust and debris through the inlet and into the collection chamber;

an alternating current (AC) parallel with the DC motor, the AC motor having a second turbine to create a second suction source in fluid communication with the collection chamber in order to draw dust and debris through the inlet and into the collection chamber;

a first filter chamber in the housing and in fluid communication with the collection chamber, wherein a first filter is disposed within the first filter chamber;

a second filter chamber in the housing and in fluid communication with the collection chamber, the second filter chamber being separate from the first filter chamber, wherein a second filter is disposed within the second filter chamber;

a manifold system adjacent to the first filter chamber and the second filter chamber, wherein the manifold system is operable to allow the portable dust extractor to extract dust via one of the first filter chamber and the second filter chamber while performing a filter cleaning operation within the other of the first filter chamber and the second chamber;

a battery receptacle configured to be connected to a battery pack;

an AC power input configured to be connected to an AC power source; and a control unit in operable communication with the AC motor, the DC motor, and a vacuum switch having an on position, and wherein the control unit is configured to selectively activate only one of the AC motor or the DC motor upon the vacuum switch being placed in the on position and based at least in part on whether a battery pack is connected to the battery receptacle and whether the AC power input is connected to the AC power source.

9. The portable dust extractor of claim 8, wherein the manifold system further comprises a first junction chamber in fluid communication with the first filter chamber, the first junction chamber including a suction opening leading to the suction source and an ambient air opening; and a second junction chamber in fluid communication with the second filter chamber, the second junction chamber including a suction opening leading to the suction source and an ambient air opening, the second junction chamber being separate from the first junction chamber.

10. The portable dust extractor of claim 9, wherein the manifold system further comprises a first plunger including a first sealing member and a second sealing member, the first plunger movable between a first position in which the first sealing member of the first plunger is spaced from the suction opening of the first junction chamber and the second sealing member of the first plunger seals the ambient air opening of the first junction chamber, and a second position in which the first sealing member of the first plunger seals the suction opening of the first junction chamber and the second sealing member of the first plunger is spaced from the ambient air opening of the first junction chamber, wherein the first plunger is biased toward the first position via a spring.

11. The portable dust extractor of claim 10, wherein the manifold system further comprises a second plunger including a first sealing member and a second sealing member, the second plunger movable between a first position in which the first sealing member of the second plunger is spaced from the suction opening of the second junction chamber and the second sealing member of the second plunger seals the ambient air opening of the second junction chamber, and a second position in which the first sealing member of the second plunger seals the suction opening of the second junction chamber and the second sealing member of the second plunger is spaced from the ambient air opening of the second junction chamber, wherein the second plunger is biased toward the first position.

12. The portable dust extractor of claim 11, wherein the manifold system further comprises a first solenoid that is activatable to move the first plunger from its first position to its second position; and a second solenoid that is activatable to move the second plunger from its first position to its second position.

13. The portable dust extractor claim 12, wherein the first filter is cleaned when the suction source is activated, the first solenoid is activated, and the second solenoid is deactivated, such that ambient air passes moves the ambient air opening of the first junction chamber and through the first filter, such that the ambient air moves dust and debris off a dirty side of the first filter, and wherein the second filter is cleaned when the suction source is activated, the second solenoid is activated, and the first solenoid is deactivated, such that ambient air moves through the ambient air opening of the second junction chamber and through the second filter, such that the ambient air moves dust and debris off a dirty side of the second filter.

14. A portable dust extractor comprising:

a housing;

a collection chamber in the housing;

an inlet on the housing and leading to the collection chamber;

a direct current (DC) motor having a first turbine to create a first suction source in fluid communication with the collection chamber in order to draw dust and debris through the inlet and into the collection chamber;

an alternating current (AC) parallel to the DC motor, the AC motor having a second turbine to create a second suction source in fluid communication with the collection chamber in order to draw dust and debris through the inlet and into the collection chamber;

a first filter chamber in the housing and in fluid communication with the collection chamber, wherein a first filter is disposed within the first filter chamber;

a second filter chamber in the housing and in fluid communication with the collection chamber, the second filter chamber being separate from the first filter chamber, wherein a second filter is disposed within the second filter chamber;

a manifold system adjacent to the first filter chamber and the second filter chamber, wherein the manifold system comprises a plurality of solenoids that are operable to control air flow through the first filter and the second filter; and a solenoid controller operatively coupled to the plurality of solenoids within the manifold system, wherein the solenoid controller is operable to place the manifold system in a vacuum configuration in which air is permitted to flow through the first filter in a first filter direction and the second filter in a second filter direction, wherein the solenoid controller is operable to place the manifold system in a first filter cleaning configuration in which air is permitted to flow through the first filter in a first debris removal direction and air is permitted to flow through the second filter in the second filter direction; and wherein the solenoid controller is operable to place the manifold system in a second filter cleaning configuration in which air is permitted to flow through the first filter in the first filter direction and air is permitted to flow through the second filter in a second debris removal direction, wherein the solenoid controller is operable to initiate a first filter cleaning cycle during which the manifold system alternates from the vacuum configuration to the first filter cleaning configuration and back to the vacuum configuration two or more times in sequence, and wherein the solenoid controller is operable to initiate a second filter cleaning cycle during which the manifold system alternates from the vacuum configuration to the second filter cleaning configuration and back to the vacuum configuration two or more times in sequence.

15. The portable dust extractor of claim 14, wherein the manifold system further comprises a first junction chamber in fluid communication with the first filter chamber, the first junction chamber including a suction opening leading to the suction source and an ambient air opening;

a first plunger including a first sealing member and a second sealing member; and a first solenoid within the plurality of solenoids operatively coupled to the first plunger.

16. The portable dust extractor of claim 15, wherein the first plunger is movable between a first position in which the first sealing member of the first plunger is spaced from the suction opening of the first junction chamber and the second sealing member of the first plunger seals the ambient air opening of the first junction chamber, and a second position in which the first sealing member of the first plunger seals the suction opening of the first junction chamber and the second sealing member of the first plunger is spaced from the ambient air opening of the first junction chamber.

17. The portable dust extractor of claim 16, wherein the first plunger is biased toward the first position via a spring and the first solenoid is activatable to move the first plunger from the first position to the second position.

18. The portable dust extractor of claim 15, wherein the manifold system further comprises:

a second junction chamber in fluid communication with the second filter chamber, the second junction chamber including a suction opening leading to the suction source and an ambient air opening, the second junction chamber being separate from the first junction chamber;

a second plunger including a first sealing member and a second sealing member; and a second solenoid within the plurality of solenoids operatively coupled to the second plunger.

19. The portable dust extractor of claim 18, wherein the second plunger is movable between:

a first position in which the first sealing member of the second plunger is spaced from the suction opening of the second junction chamber and the second sealing member of the second plunger seals the ambient air opening of the second junction chamber, and a second position in which the first sealing member of the second plunger seals the suction opening of the second junction chamber and the second sealing member of the second plunger is spaced from the ambient air opening of the second junction chamber.

20. The portable dust extractor of claim 19, wherein the second plunger is biased toward the first position via a spring and the second solenoid is activatable to move the second plunger from the first position to the second position.

* * * * *